(12) United States Patent
Berkman et al.

(10) Patent No.: US 7,508,834 B2
(45) Date of Patent: Mar. 24, 2009

(54) WIRELESS LINK FOR POWER LINE COMMUNICATIONS SYSTEM

(75) Inventors: William H. Berkman, New York, NY (US); David Stanley Yaney, Poolesville, MD (US)

(73) Assignee: Current Technologies, LLC, Germantown, MD (US)

( * ) Notice: Subject to any disclaimer, the term of this patent is extended or adjusted under 35 U.S.C. 154(b) by 651 days.

(21) Appl. No.: 11/156,614

(22) Filed: Jun. 21, 2005

(65) Prior Publication Data

US 2007/0002876 A1    Jan. 4, 2007

(51) Int. Cl.
- H04B 7/00 (2006.01)
- H04B 7/14 (2006.01)
- H04B 3/36 (2006.01)
- H04L 12/28 (2006.01)
- H04L 12/56 (2006.01)

(52) U.S. Cl. ............... 370/401; 370/277; 370/279; 370/293; 370/315

(58) Field of Classification Search ........ 370/277, 370/279, 293, 315, 401
See application file for complete search history.

(56) References Cited

U.S. PATENT DOCUMENTS

| | | | |
|---|---|---|---|
| 3,980,954 A | 9/1976 | Whyte | |
| 4,199,761 A | 4/1980 | Whyte et al. | |
| 4,701,945 A | 10/1987 | Pedigo | |
| 5,056,107 A | 10/1991 | Johnson et al. | |
| 5,481,249 A | 1/1996 | Sato | |
| 5,994,998 A | 11/1999 | Fisher et al. | |
| 6,130,896 A | 10/2000 | Lueker et al. | |
| 6,140,911 A | 10/2000 | Fisher et al. | |
| 6,175,860 B1 | 1/2001 | Gaucher | |
| 6,243,413 B1 | 6/2001 | Beukema | |
| 6,243,571 B1 | 6/2001 | Bullock et al. | |
| 6,346,875 B1 | 2/2002 | Puckette et al. | |
| 6,441,723 B1 | 8/2002 | Mansfield, Jr. et al. | |
| 6,480,510 B1 | 11/2002 | Binder | |
| 6,710,721 B1 | 3/2004 | Holowick | |
| 6,737,984 B1 | 5/2004 | Welles et al. | |
| 6,778,817 B1 | 8/2004 | Bullock et al. | |
| 6,842,459 B1 | 1/2005 | Binder | |
| 6,885,674 B2 | 4/2005 | Hunt et al. | |
| 6,965,303 B2 | 11/2005 | Mollenkopf | |

(Continued)

FOREIGN PATENT DOCUMENTS

DE    100 61 584 A1    6/2002

(Continued)

OTHER PUBLICATIONS

"Outlook Conference 2004: Amperion Deployment Overview", *Primen Conference*, (May 7, 2004),1-10.

*Primary Examiner*—Ronald Abelson
(74) *Attorney, Agent, or Firm*—Mel Barnes; Capital Legal Group, LLC

(57) ABSTRACT

One embodiment of the present invention may include of plurality of wireless hops that provide a multi-hop wireless link for facilitating the communication of voice, video, audio, and other data in a packet based network between a broadband power line communications network and a conventional telecommunications link (such as a fiber optic link), which may be connected to another network such as the Internet via a point-of-presence.

40 Claims, 5 Drawing Sheets

U.S. PATENT DOCUMENTS

| | | |
|---|---|---|
| 6,980,090 B2 | 12/2005 | Mollenkopf |
| 6,980,091 B2 | 12/2005 | White et al. |
| 6,985,714 B2 | 1/2006 | Akiyama et al. |
| 6,993,317 B2 | 1/2006 | Belsak, Jr. |
| 6,998,962 B2 | 2/2006 | Cope et al. |
| 7,042,351 B2 | 5/2006 | Kline |
| 7,113,134 B1 | 9/2006 | Berkman |
| 7,218,219 B2 | 5/2007 | Kline |
| 7,269,403 B1 | 9/2007 | Miao |
| 7,280,073 B2 * | 10/2007 | Sayers ............... 342/432 |
| 7,356,010 B2 * | 4/2008 | He et al. ............. 370/338 |
| 2003/0100288 A1 | 5/2003 | Tomlinson, Jr. et al. |
| 2003/0129978 A1 | 7/2003 | Akiyama et al. |
| 2003/0133420 A1 | 7/2003 | Haddad |
| 2003/0224784 A1 | 12/2003 | Hunt et al. |
| 2004/0047335 A1 | 3/2004 | Proctor et al. |
| 2004/0090312 A1 | 5/2004 | Manis et al. |
| 2004/0110483 A1 * | 6/2004 | Mollenkopf ............ 455/402 |
| 2004/0176026 A1 | 9/2004 | Gainey et al. |
| 2004/0198453 A1 | 10/2004 | Cutrer et al. |
| 2004/0223470 A1 | 11/2004 | Smith |
| 2004/0227622 A1 | 11/2004 | Giannini et al. |
| 2005/0055729 A1 | 3/2005 | Atad et al. |
| 2005/0068915 A1 | 3/2005 | Atad et al. |
| 2005/0076149 A1 | 4/2005 | McKown et al. |
| 2005/0085259 A1 | 4/2005 | Conner et al. |
| 2005/0111533 A1 | 5/2005 | Berkman |
| 2005/0164666 A1 | 7/2005 | Lang et al. |
| 2005/0226200 A1 | 10/2005 | Askildsen et al. |
| 2005/0239400 A1 | 10/2005 | Narikawa |
| 2005/0249245 A1 | 11/2005 | Hazani et al. |
| 2005/0251401 A1 | 11/2005 | Shuey |
| 2005/0259668 A1 | 11/2005 | Kim |
| 2005/0285720 A1 | 12/2005 | Cope et al. |
| 2006/0132299 A1 | 6/2006 | Robbins et al. |
| 2006/0220833 A1 | 10/2006 | Berkman |
| 2006/0238364 A1 * | 10/2006 | Keefe et al. ............. 340/646 |
| 2006/0286927 A1 | 12/2006 | Berkman |
| 2007/0002772 A1 | 1/2007 | Berkman et al. |
| 2007/0002876 A1 | 1/2007 | Berkman et al. |
| 2007/0118864 A1 * | 5/2007 | Champion et al. ........... 725/81 |
| 2007/0256001 A1 * | 11/2007 | Suzuki et al. ............ 714/774 |
| 2007/0287406 A1 | 12/2007 | Kline |
| 2008/0018491 A1 | 1/2008 | Berkman et al. |

FOREIGN PATENT DOCUMENTS

| | | |
|---|---|---|
| DE | 100 61 586 A1 | 6/2002 |
| WO | WO-99/59261 A1 | 11/1999 |
| WO | WO-03/039022 A1 | 5/2003 |

* cited by examiner

WIRELESS LINK FOR POWER LINE COMMUNICATIONS SYSTEM

FIELD OF THE INVENTION

The present invention generally relates to data communications over a power distribution system and more particularly, to a multi-hop wireless link for providing a backhaul link of a power line communications system and method of using the same.

BACKGROUND OF THE INVENTION

Well-established power distribution systems exist throughout most of the United States, and other countries, which provide power to customers via power lines. Recently, such power distribution systems have been used to communicate data in a power line communications system (PLCS) Such systems may provide broadband communications of voice, video, audio, Internet and other data. I Irrespective of the architecture of the PLCS, a method of communicating data between the power line and the conventional telecommunications network (e.g., a point of presence (POP) for the Internet) must be provided.

In one example PLCS embodiment, a backhaul point forms the gateway between the power line and conventional telecommunications medium and communicates with a plurality of downstream communication devices such as transformer bypass devices. The backhaul point and its plurality of communication devices (and their associated user devices) form a PLCS subnet. Depending on the placement (i.e., distance) of the backhaul point relative to the available conventional telecommunications network such as a fiber optic cable (which may be at the utility substation or elsewhere), it is sometimes impossible to directly connect the backhaul point to the fiber optic cable to provide communications with the network. In other words, the fiber optic cable may not be available where the backhaul point is installed, which generally means that additional fiber optic cable(s) must be installed. However, installing additional fiber optic cable can be an expensive and, in some instances, may not viable due to the existing infrastructure such as intersections and other obstacles.

Consequently, there is a need for technology to provide a communications link that communicatively couples a PLCS (such as one or more backhaul points) to a conventional telecommunications network that is economical, easy to implement, provides a high bandwidth, provides low latency, and that is reliable. These and other advantages are provided by various embodiments of the present invention.

SUMMARY OF THE INVENTION

The present invention provides a system for providing a communications link between one or more power line communications system subnets and a remote conventional telecommunications medium, which may include a fiber optic cable, a coaxial cable, a point of presence, or other device or network. One embodiment of the present invention may include of plurality of wireless hops that provide a multi-hop wireless link for facilitating the communication of voice, video, audio, and other data in a packet based network between a broadband power line communications network and a conventional telecommunications link (such as a fiber optic link), which may be connected to another network such the Internet via a point of presence.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

Figure 1:
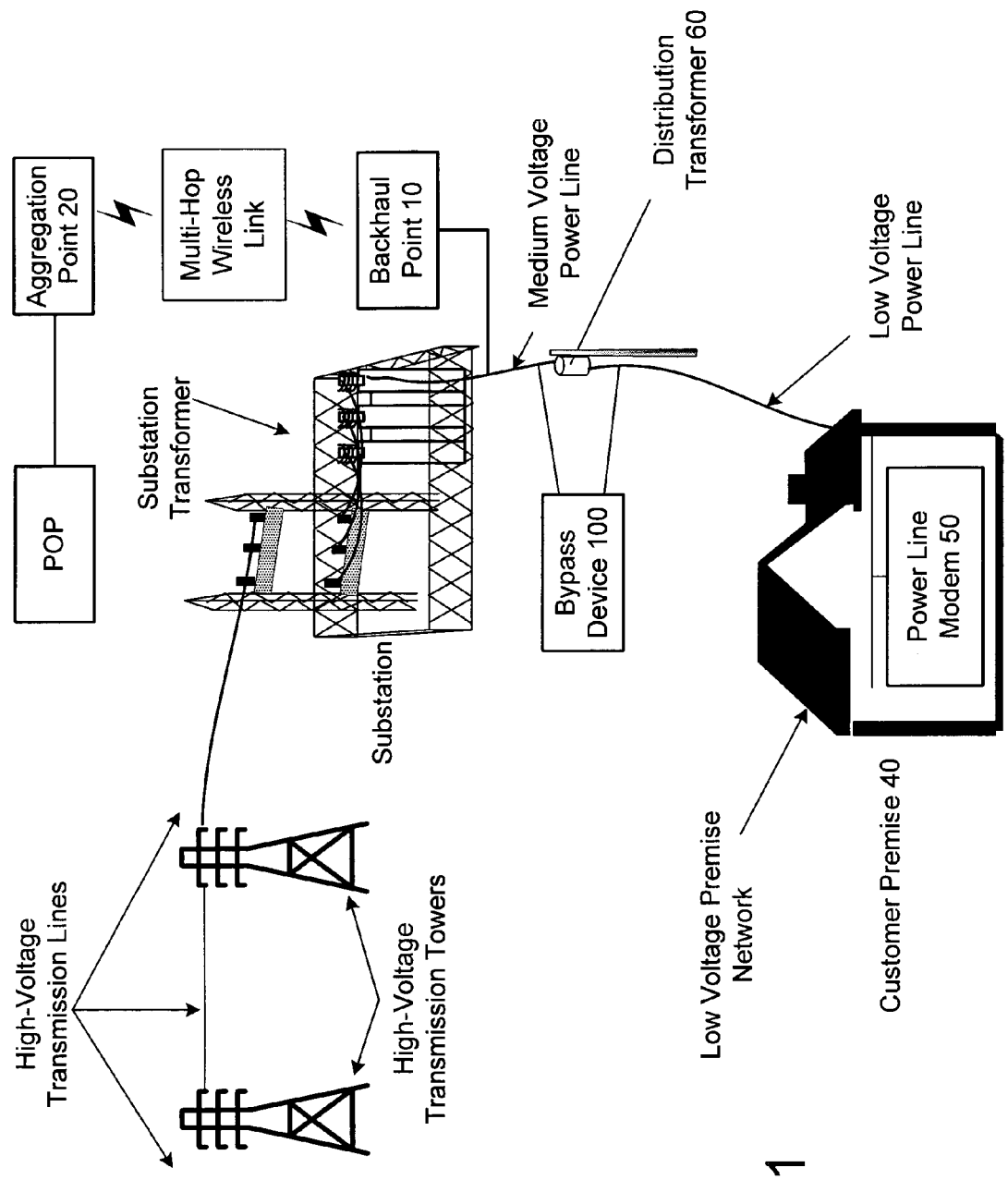
FIG. 1 is a diagram of the exemplary power distribution system of FIG. 1 operating as a power line communications system, in accordance with an embodiment of the present invention.

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

System Architecture and General Design Concepts

Power distribution systems typically include high voltage (HV), medium voltage (MV) and low voltage (LV) power lines. Typically, MV ranges from about 1000 V to about 100 kV and LV typically ranges from about 100 V to about 240 V. Transformers are used to convert between the respective voltage portions, e.g., between the HV section and the MV section and between the MV section and the LV section. Transformers have a primary side for connection to a first voltage (e.g., the MV section) and a secondary side for outputting another (usually lower) voltage (e.g., the LV section). Such transformers are often referred to as distribution transformers or a step down transformers, because they "step down" the voltage to some lower voltage. Transformers, therefore, provide voltage conversion for the power distribution system. Thus, power is carried from substation transformer to a distribution transformer over one or more MV power lines. Power is carried from the distribution transformer to the customer premises via one or more LV power lines.

In addition, a distribution transformer may function to distribute one, two, three, or more phase power signals to the customer premises, depending upon the demands of the user. In the United States, for example, these local distribution transformers typically feed anywhere from one to ten homes, depending upon the concentration of the customer premises in a particular area. Distribution transformers may be pole-top transformers located on a utility pole, pad-mounted transformers located on the ground, or transformers located under ground level.

Power Line Communication System

The present invention may form part of a PLCS to facilitate communications signals to and from communication devices on the PLCS network. For example, the present invention may facilitate communication of data signals to and from communications devices communicatively coupled to the MV power line, such as backhaul points or transformer bypass devices in either overhead or underground power systems. Thus, the following brief description provides one example PLCS with which the present invention may be used.

A portion of an example overhead PLCS is shown in FIG. 1 and includes one or more communications devices, which may be transformer bypass devices (BDs). In this illustration, only one communications device (bypass device 100) is depicted. However, in practice five, ten, or more communications devices may form part of a single PLCS subnet. The communications device in this embodiment is a bypass device 100 that is the gateway between the LV power line subnet (i.e., the LV power lines and the devices that are communicatively coupled to the LV power lines) and the MV power line.

In this embodiment, the BD 100 provides communications services for the user devices, which may include security management, routing of Internet protocol (IP) packets, filtering data, access control, service level monitoring, signal processing and modulation/demodulation of signals transmitted over the power lines.

In this example PLCS, the PLCS subnet also includes a backhaul point 10. Generally, however, the PLCS subnet may simply be one or more devices that communicate over the power lines. The backhaul point 10 is an interface and gateway between the power line and a non-power line telecommunications network. One or more backhaul points 10 typically are communicatively coupled to an aggregation point (AP) 20 that may be coupled to (or form part of) a point of presence (POP) to the Internet. In such systems, the backhaul point 10 typically is connected to the AP 20 by a fiber optic cable. Thus, the backhaul point 10 may include a fiber optic transceiver suited for communicating through the fiber optic cable (the "backhaul link").

The AP 20 may include a conventional Internet Protocol (IP) data packet router and may be directly connected to an Internet backbone thereby providing access to the Internet (and be a POP). Alternatively, the AP 20 may be connected to a core router (not shown), which provides access to the Internet, or other communication network. Depending on the configuration of the PLCS, a plurality of APs 20 may be connected to a single core router which provides Internet access. The core router (or AP 20 as the case may be) may route voice traffic to and from a voice service provider and route Internet traffic to and from an Internet service provider. The routing of packets to the appropriate provider may be determined by any suitable means such as by including information in the data packets to determine whether a packet is voice. If the packet is voice, the packet may be routed to the voice service provider and, if not, the packet may be routed to the Internet service provider. Similarly, the packet may include information (which may be a portion of the address) to determine whether a packet is Internet data. If the packet is Internet data, the packet may be routed to the Internet service provider and, if not, the packet may be routed to the voice service provider.

In some PLCS embodiments, there may a distribution point (not shown) between the backhaul point 10 and the AP 20. The distribution point, which may comprise a router, may be coupled to a plurality of backhaul points 10 and provides routing functions between its backhaul points 10 and its AP 20. In one example embodiment, a plurality of backhaul points 10 are connected to each distribution point and each distribution point (of which there is a plurality) is coupled to the AP 20, which provides access to the Internet and other networks.

The PLCS also may include a power line server (PLS) that is a computer system with memory for storing a database of information about the PLCS and includes a network element manager (NEM) that monitors and controls the PLCS. The PLS allows network operations personnel to provision users and network equipment, manage customer data, and monitor system status, performance and usage. The PLS may reside at a remote operations center to oversee a group of communication devices via the Internet. The PLS may provide an Internet identity to the network devices by assigning the devices (e.g., user devices, BDs 100, (e.g., the LV modems and MV modems of BDs), LV and MV repeaters, backhaul points 10, and AP 20) an IP address and storing the IP address and other device identifying information (e.g., the device's location, address, serial number, etc.) in its memory. In addition, the PLS may approve or deny user devices authorization requests, command status reports and measurements from the BDs, repeaters, and backhaul points, and provide application software upgrades to the communication devices (e.g., BDs, backhaul points, repeaters, and other devices). The PLS, by collecting electric power distribution information and interfacing with utilities' back-end computer systems may provide enhanced distribution services such as automated meter reading, outage detection, load balancing, distribution automation, Volt/Volt-Amp Reactance (Volt/VAr) management, and other similar functions. The PLS also may be connected to one or more APs and/or core routers directly or through the Internet and therefore can communicate with any of the BDs, repeaters, user devices, backhaul points and other network elements through the respective AP and/or core router.

At the user end of the PLCS, data flow originates from a user device, which provides the data to a power line modem (PLM) (sometimes referred to as a power line modem), which is well-known in the art.

Various electrical circuits within the customer's premises distribute power and data signals within the customer premises. The customer draws power on demand by plugging a device into a power outlet. In a similar manner, the customer may plug the power line modem into a power outlet to digitally connect user devices to communicate data signals carried by the power wiring. The PLM thus serves as an interface for user devices to access the PLCS. The PLM can have a variety of interfaces for customer data appliances. For example, a PLM can include a RJ-11 Plain Old Telephone Service (POTS) connector, an RS-232 connector, a USB connector, a 10 Base-T connector, RJ-45 connector, and the like. In this manner, a customer can connect a variety of user devices to the PLCS. Further, multiple PLMs can be plugged into power outlets throughout the customer premises, with each PLM communicating over the same wiring internal to the customer premises.

The PLM may be connected to (or integrated into) any device capable of supplying data for transmission (or for receiving such data) including, but not limited to a computer, a telephone, a telephone answering machine, a fax, a digital cable box (e.g., for processing digital audio and video, which may then be supplied to a conventional television and for transmitting requests for video programming), a video game, a stereo, a videophone, a television (which may be a digital television), a video recording device, a home network device, a utility meter, or other device. The PLM 50 transmits the data received from the user device through the customer LV power line to a BD 100 and provides data received from the LV power line to the user device. The PLM 50 may also be integrated with the user device, which may be a computer, stereo, audio/video presentation device, or audio/video storage device. In addition, the functions of the PLM 50 may be integrated into a smart utility meter such as a gas meter, electric meter, water meter, or other utility meter to thereby provide automated meter reading (AMR).

The BD 100 typically transmits the data to the backhaul point 10, which, in turn, transmits the data to the AP 20. The AP 20 then transmits the data to the appropriate destination (perhaps via a core router), which may be a network destination (such as an Internet address) in which case the packets are transmitted to, and pass through, numerous routers (herein routers are mean to include both network routers and switches) in order to arrive at the desired destination.

A detailed description of an example PLCS, its components and features is provided in U.S. patent application Ser. No. 10/641,689 filed Aug. 14, 2003, entitled "Power Line Communication System and Method of Operating the Same," which is hereby incorporated by reference in its entirety. Another example PLCS its components and features are described in U.S. patent application Ser. No. 10/973,493 filed Oct. 26, 2004, entitled "Power Line Communications System and method of Operating the Same," which is hereby incorporated by reference in its entirety. Thus, the present invention may form part of or be used with both overhead and underground PLCSs. However, the multi-hop wireless link described herein may be used with other power line communications systems. In other systems, data may be communicated via the medium voltage power line and then communicated wirelessly to and from the customer location (e.g., using an IEEE 802.11 protocol). In other systems, the data may be transmitted through the distribution transformer to the customer location (e.g., with or without a repeater on the low voltage power line). In another example system, surface waves may be communicated on the medium voltage power line instead of, or in addition to, conventional conductive signals. Thus, the invention is not limited to a particular PLCS, PLCS architecture, or topology or type of network.

The present invention provides a means for providing at least a portion of a backhaul link between the PLC network and the AP or other upstream device (e.g., distribution point, POP, CMTS, etc.) and which does not interfere with communications on the MV power line. The present invention may be comprised of one or more wireless hops that communicatively couple one or more PLCS subnets with an aggregation point or other upstream device. Through out this description "PLCS subnet" shall be used to refer to a backhaul point and its associated downstream devices such as MV repeaters, bypass devices, LV repeaters, power line modems, and other communication devices that communicate via the power lines. In this description, the line of delineation of the example PLCS subnet typically will be at the device that transitions the signals between the power line and another medium which device is referred to herein as a backhaul point. In one example PLCS, a backhaul point 10 may be comprised of a wireless transceiver (e.g., an IEEE 802.11a,b, or g transceiver, or a 60 GHz transceiver), a MV transceiver, and a controller (which may include a router) in communication with both transceivers.

Figure 2:
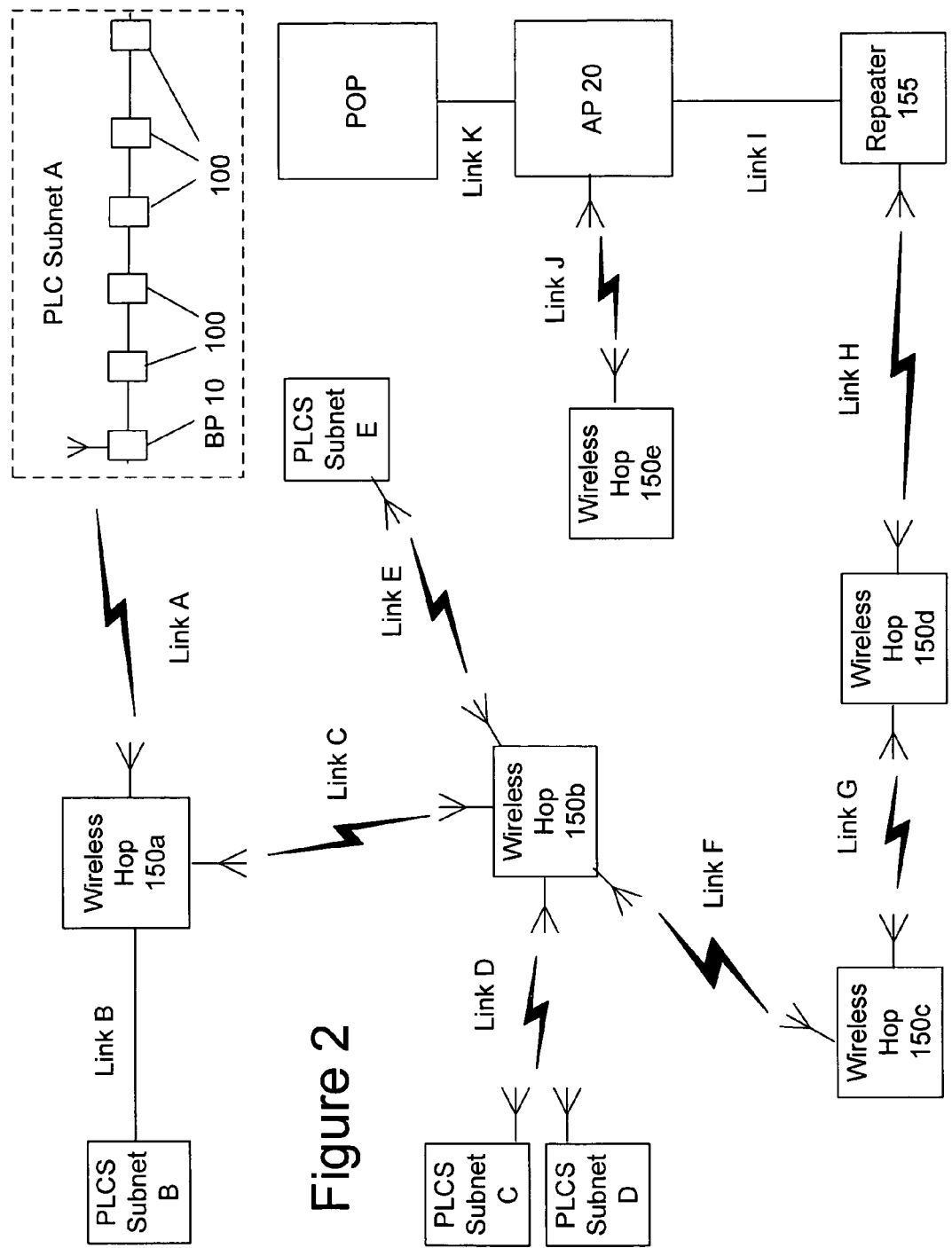
FIG. 2 is a schematic diagram of an example embodiment of the present invention.

FIG. 2 illustrates an example embodiment of the present invention. FIG. 2 depicts a plurality of PLCS subnets that are communicatively coupled to an AP 20 (and POP) via a multi-hop wireless link system. Each multi-hop wireless link may include two or more wireless links. In this example, PLCS subnet A is in communication with upstream wireless hop 150a via wireless Link A. Wireless hop 150a also provides communications to and from PLCS subnet B (via wired Link B) and is in communication with wireless hop 150b via wireless Link C. Wireless hop 150b also is communicatively coupled to PLCS Subnets C and D via wireless Link D and to PLCS subnet E via wireless Link E. Wireless hop 150b also is in communication with upstream wireless hop 150c via wireless Link F, which, in turn, is in communication with upstream wireless hop 150d via wireless Link G. Wireless hop 150d also is in communication with upstream repeater 155 via wireless Link H. Repeater 155 is in communication with AP 20 via Link I, which may be a fiber optic, coaxial, power line (e.g., medium, high or low voltage power line cable or conductor(s)) or twisted pair wire link (e.g., digital subscriber line (DSL), coaxial cable, Ethernet cable, or wireless link. AP 20 also is in communication with wireless hop 150e via wireless Link J and in communication with the POP via Link K, which may be comprised of any suitable communication medium(s). Although not shown in the figure, it will be evident to those skilled in the art that wireless hop 150e may also provide communication to other downstream devices (e.g., wireless hops and PLCS subnets) as well.

One example implementation of this embodiment and the other embodiments described herein may include a radio model GE60 manufactured by Bridgewave Communications, Inc., 3350 Thomas Road, Santa Clara, Calif. 95054. The GE60 radios manufactured by Bridgewave Communications, Inc. are point-to-point high speed, low latency, 60 GHz radios.

In another example embodiment, the wireless hops 150 may comprise a first and second 802.11a modem—one radio associated with each antenna shown in FIG. 2 (which may be directional antennas that are aligned (aimed) during installation for improved communications). For example, wireless hops 150c and 150d each may comprise a first 802.11 radio (modem and antenna) for communicating downstream and a second radio for communicating upstream. In this example, wireless hop 150b may include four radios and wireless hop 150a may include two radios and one wired transceiver for Link B. Wireless hops 150a-b also may comprise a router or switch for prioritizing and routing packets.

Depending on the physical layout of the network, the communication requirements, the cost constraints, and other factors, other embodiments may employ fewer modems and/or fewer antennas. For example, in an alternate embodiment, wireless hop 150c may be comprised of a single modem chip but still employ two directional antennas. Alternately, wireless hop 150c may be an amplifying wireless hop and comprise a first antenna connected to a first filter (for filtering for the frequency band to be received), which may be connected to a first amplifier that is connected to a first frequency converter to frequency convert the signal to the desired band (e.g., an orthogonal frequency band). The frequency converter may be connected to a second amplifier to amplify and transmit the signal via the second antenna (e.g., without demodulating, decoding, decrypting, processing, encoding, encrypting, or modulating). Similarly, wireless hop 150c may have another set of these components (except for the antennas) for communications in the downstream direction.

Any suitable radio may be used to implement the invention. In some embodiments, it may be desirable to use 60 GHz unlicensed radios, which may offer significant throughput, significant frequency (and channel) availability (e.g., to provide orthogonal channels), small size, and narrow beam antennas (thereby reducing the likelihood of interference), which may be less than ten degrees, more preferably less than five degrees, and still more preferably less than two degrees. In addition, 60 GHz transmissions may have greater oxygen absorption thereby further reducing the likelihood of interference. In addition, the transmit power of each radio may be adjusted so as to transmit with sufficient power to communicate with the designated receiver(s) (with sufficient margin), but so that the signal is not received by unintended receivers.

As discussed, in some embodiments, one or more of the wireless hops 150 may include wired port and a switch or router between the two wireless ports (e.g., radios). Referring to FIG. 2, wireless hop 150a may include two radios—one for each wireless Link A and C. In addition, wireless hop 150a may include a wired port for communicating via Link B with PLCS Subnet B. The wired port may include a fiber optic transceiver, Ethernet port, DSL modem, cable modem, or any port/modem suitable for communicating over the available medium. In this example embodiment, wireless hop 150a may be co-located (e.g., on the same utility pole) with the backhaul point of PLCS Subnet B and the Link B may be an Ethernet cable. Consequently, wireless hop 150a may include an Ethernet port. Because the wireless hop 150a includes multiple ports, it may be desirable to include a router or switch communicatively coupled to the ports to control traffic therethrough. Similarly, it may be desirable to include a router or switch in wireless hop 150b, while it may be unnecessary to include a switch or router in other wireless hops (e.g., hops 150c and 150d). The router may also prioritize packets through the wireless hop 150 by giving higher priority to voice data, video data, audio data, gaming data, and other time sensitive data.

In addition, the radios of the wireless hops 150 may be programmable to tune (for transmission and/or reception) to different frequency bands (licensed or unlicensed), upon receiving a command from the PLS. Consequently, if interference in an unlicensed band becomes too great, the wireless hops might switch to a licensed band or a different unlicensed band. In addition, while the wireless hops described herein use different frequencies to create orthogonality, other embodiments may use other methods of creating orthogonality (e.g., such as polarity). The wireless hops 150 may be point-to-point or point-to-multipoint.

In addition, it may be desirable to include executable software code to implement Simple Network Management Protocol (SNMP) in the wireless hops, which may facilitate network monitoring and control. It may be desirable to provide shielding or other techniques well known in the art to provide RF isolation between the upstream and downstream ports.

As is evident from FIG. 2, this example embodiment has numerous wireless hops 150 and each hop 150 may aggregate data from multiple PLCS subnets (e.g., as depicted by wireless hops 150a and b). Data from PLCS subnet A must pass through four wireless hops (wireless hops 150a-d), and repeater 155, to AP 20. One important characteristic of many communication systems is latency. Latency is especially important in communications systems that facilitate communication of voice data such as voice over internet protocol (VoIP) telephone calls. If the system latency is too great, the user may experience an undesirable delay during conversations. Video, audio, and other data also may be sensitive to latency or jitter, (which results in latency). Consequently, the multi-hop wireless link of the present invention—whether comprised of two, three, four, or more wireless links—may have a latency that is less than twenty milliseconds, more preferably less than ten milliseconds, even more preferably less than six milliseconds, and even still more preferably less than two milliseconds (e.g., for ninety-nine percent of the data by the link). Such latencies may allow enough time for communication through other portions of the communications path (such as those in the PLCS subnet or upstream from the multi-hop wireless link) so that the overall latency of the data communications path is sufficiently low to be acceptable for most applications including some voice and other latency sensitive communications.

One means of reducing the latency of the multi-hop wireless link is to reduce the amount of overhead processing performed by some or all of the wireless hops 150. For example, reducing the number of error detection/corrections performed by the link may reduce the overall latency of the multi-hop wireless link because error detection/correction can be a somewhat computational and, therefore, use up processing time. Typically, each wireless radio may perform error detection (e.g., performing a checksum) and, if an error is detected, perform error correction on data received and transmitted. Thus, one method of reducing the amount of error detection (and correction) of the multi-hop wireless link system would be to perform error detection/correction only at predetermined or selected wireless hops. By performing error detection/correction at the ends of the wireless link, but not at the hops between the ends of the link, the overall processing and associated latency of the wireless hop system may be reduced. For example, for downstream error detection/correction (i.e., on transmissions in the direction away from the AP 20), error detection/correction might only be performed by (1) the most upstream wireless hop 150 that aggregates upstream data (e.g., wireless hop 150b in FIG. 2) (2) the wireless hops that have more than one downstream link (i.e., that aggregate upstream data) (e.g., wireless hop 150b and wireless hop 150a); or (3) at the power line subnet interface device (PSID) (e.g., a backhaul point) Similarly, for upstream error detection/correction (i.e., on transmissions toward the AP 20), upstream error detection/correction may be performed by (a) the most upstream wireless hop (e.g., wireless hop 150d in FIG. 2), or (b) at the upstream wireless interface device (e.g., repeater 155 or an AP 20). Thus, the error detection/correction might only be performed at some combination of (1), (2), or (3), and (a) or (b).

The devices that perform error detection/correction may also perform other processing such as, for example, processing to reduce errors over the portion of the wireless link that does not perform error correction. One or more devices at or near the ends of the multi-hop wireless link (e.g., such as at backhaul point or a wireless hop 150d) may break up larger packets (e.g., Ethernet frame packets) into smaller sized packets for transmission. In the middle of the multi-hop wireless link, the devices (e.g., wireless hop 150c) may decode and encode but not perform error detection or correction. At or near the downstream end of the multi-hop wireless link, device(s) (e.g., wireless hop 150b) may receive and resemble packet parts into larger packets (e.g., Ethernet packets), and perform error detection and correction (e.g., an Ethernet checksum). Similarly, the same devices also may break up larger packets and reassemble them for upstream data transmissions. The breaking up and reassembling of packets may be performed via software in the media access control (MAC)

layer of the modems or via a separate processor. While fast error processors may be available, there are often expensive and may be unnecessary in the present invention. In practice, in some embodiments it may be desirable to simply ensure that the transmitter is not waiting for data to transmit, which may or may not require forgoing error correction and/or other processing.

To reduce the need for error correction and/or other processing, it may also be desirable to limit the number of errors. One means of reducing the number of errors is to reduce the distance between the wireless hops 150. Thus, it may be desirable to install the wireless hops 150 so that the distance to the devices with which they wirelessly communicate is less than a predetermined threshold distance, which may be, for example, one thousand feet. The predetermined threshold distance may be 1) a percentage of the maximum communication distance for which the wireless transceiver is rated under worst conditions (e.g., rain), 2) a percentage of the maximum distance for which the communication protocol specification requires or permits communications; 3) determined by trial and error (e.g., testing the error rate at various rates), or 4) otherwise determined to provide an acceptable error rate (which may be a maximum error rate). The threshold distance may be fixed for a given wireless transceiver and/or system, or may vary depending on the location of system, network topology, climate, environmental features (trees, hills, etc.), and other factors.

In some embodiments, some wireless hops 150 may perform error detection/correction and/or other processing and some may not. For example, in another example embodiment, every other wireless hop 150 performs error detection/correction and the remaining do not. Alternately, all the wireless hops 150 of a first segment of a particular multi-hop wireless link may perform error detection/correction (e.g., because the wireless hops of that segment cannot be installed at distances less than the threshold distance or because they aggregate data) and those of a second segment may not perform error detection/correction (e.g., because they can be installed at distances less than the threshold distance and/or because they do not aggregate).

While the above example embodiment, includes wireless hops that do not perform forward error detection/correction, other embodiments may comprise wireless hops that do not perform additional or alternate overhead processing such as channel encoding/decoding, parity checking, and source encoding/decoding. In fact, in some instances and depending on the application, hardware, and functional specifications, it may be desirable to filter (for the frequency band to be received), amplify, frequency shift to the desired band if necessary (e.g., an orthogonal frequency band), and transmit (e.g., without demodulating, decoding, decrypting, processing, encoding, encrypting, or modulating). Such a device is referred to herein as an amplifying wireless hop while those that demodulate and modulate data for transmission are herein referred to as a repeating wireless hops when the distinction is necessary. Although the noise in the signal band also may be amplified by an amplifying wireless hop, the link may still function satisfactorily if the signal-to-noise ratio (SNR) of the data signal is adequate. In order to keep the SNR above a minimum threshold the data signal may be periodically (e.g., at every second, every third, or every fourth wireless hop) demodulated and modulated the data to remove the noise and improve the SNR. However, where latency or other considerations are of great concern, it may be desirable to cascade two, three, four, or more amplifying wireless hops together (collectively referred to herein as an amplifying link), which may form a link between two repeating wireless hops, a repeating wireless hop and a PLCS subnet, or a PLCS subnet and an AP.

The wireless links described herein may use any suitable frequency band such as the licensed frequency bands (e.g., 6 GHz, 11 GHz, 18 GHz, 23 GHz, 24 GHz, 28 GHz, or 38 GHz band) or unlicensed frequency bands (e.g., 900 MHz, 2.4 band, 5.8 Ghz, 24 GHz, 38 GHz, or 60 GHz (i.e., 57-64 GHz)). In some environments, licensed bands may be desirable because they are likely to experience less interference and potentially fewer errors. Other frequencies that may be used may include bands at the 75 GHz and 90 GHz frequencies. In addition, higher frequency bands sometimes equate to smaller antennas and/or other characteristics that may be more suitable for the implementation of the invention than lower frequencies. Thus, in some embodiments, it may desirable to use frequencies that are greater than 2 GHZ, more preferably greater than 5 GHz, still more preferably greater than 22 GHz, and even more preferably greater than 57 GHz.

In one embodiment, it may be desirable to communicate via the IEEE 802.11a standard. As is known to those skilled in the art, the IEEE 802.11a standard includes four channels in three bands. Specifically, it employs channels 36, 40, 44, and 48 in the 5.15 to 5.25 GHz band ("low band"), channels 52, 56, 60 and 65 in the 5.25 to 5.35 GHz band ("mid-band"), and channels 149, 153, 157, and 161 in the 5.725 to 5.825 band ("high band"). The permitted transmission power in the bands is 2.5 mW/MHz in the low band, 12.5 mW/MHz in the mid-band, and 8 mW/MHz in the high band. Thus, in some embodiments, it may be desirable to use the mid-band due to the higher permitted transmission power, which may reduce errors. In other embodiments, it may be desirable to select the band(s) having less interference.

As discussed, the multi-hop wireless communications link of the present invention is bi-directional and may be full duplex. If a wireless hop communicated in both the upstream and downstream directions in the same channel of a band (e.g., the same frequency), the system may have to employ time division multiplexing, which may add to system latency. Consequently, it may be desirable that each wireless hop 150 be configured to communicate in the upstream direction in a first channel (frequency band) and in the downstream direction in a second channel (frequency band) that are orthogonal. Thus, each wireless link may have two channels and each hop may communicate via four channels (e.g., two uplink and two downlink channels). In addition, because it may be desirable to place the wireless hops 150 relatively close together (e.g., to reduce the error rate), a wireless hop's transmissions could sometimes be received by a wireless hop 150 two nodes away, which is not intended to receive such transmissions. In order to prevent such potential transmissions from interfering, one embodiment may be configured so that the channels used by a particular wireless hop for its one or more downstream communications channels and its upstream channel, are all orthogonal to the channels used by the adjacent wireless hops for communications.

For example, referring to FIG. 2, in which the wireless hops 150 could employ IEEE 802.11a, the wireless link used by wireless hop 150*b* for its wireless links (i.e., Links C, D, E, and F) may be orthogonal to the links used by the repeaters 150*a* and 150*c* for communications away from wireless hop 150*b* (i.e., for communications with other wireless hops). Specifically, in this example, the frequency band used for Links C, D, E, and F may be orthogonal to those of Link A and Link G so as to ensure non-interference. In addition, and as discussed above, the frequencies for Links C, D, E, and F also may be orthogonal to each other as well.

In some embodiments, it may be desirable to use IEEE 801.16 transceiver, which is less affected by obstacles in the line of site. In addition, a reflector may used to reflect data signals around obstacles that are in the line of site, thereby permitting communications around objects that may reduce communications efficiency (e.g., increase error rate) or otherwise hinder or block communications.

In some embodiments, the wireless hops may include a processor that is communicatively coupled to and controls the operation of the radios and wired ports. Thus, in some embodiments, the wireless hops may be remotely configurable via commands transmitted from the PLS (e.g., transmitted wirelessly to the address associated with the processor). With the appropriate software, the processor also may perform the routing functions described herein. The PLS may transmit one or more commands to change the priority of data through the wireless hop or to change a communication path. For example, referring to FIG. 2, wireless hop 150c and 150b can be reconfigured so that PLCS subnet D communicates via wireless hop 150c instead of wireless hop 150b. Similarly, wireless hop 150b and 150d can be reconfigured so that wireless hop 150b communicates with wireless 150d instead of with wireless hop 150c. As will be evident to one skilled the art, such reconfigurations may require omni-directional antennas, or antennas providing sufficient wireless communications or breadth to allow for communications with multiple devices.

Additionally, for example, the upstream wireless hops for a particular PLCS subnet or wireless hop may be determined and/or reconfigured (and a first or new upstream IP address assigned by the PLS) based on the strength of the signal, line of site (e.g., reconfigure when tree leaves are no longer present), number of errors in communications with each upstream device, available capacity, or other factor that may bear on error rates, latency, or other system characteristic. This change in the communication path may result in changes in the PLS (e.g., the NEM therein), which may be communicated or confirmed to the PLS via the multi-hop wireless link. The PLS may then update its database and routing tables with the new configuration information. In addition, the PLS may monitor data traffic flow and re-assign a PLCS subnet (and/or wireless hop 150) to communicate via different wireless hop 150 by transmitting a command and configuration information, which may be received and stored by the PLCS subnet (or wireless hop 150). Thus, depending on the frequency and protocol used, some PLCS subnets (e.g., backhaul point thereof) and wireless hops 150 may include multiple antennas for upstream and downstream communications. Additionally, the wireless hops may include a filter circuit associated with one or more of its radios that can be tuned to the desired frequency band. Consequently, the frequency bands of the wireless hop may also be remotely or dynamically configured according to network and environmental conditions.

In addition to or instead being remotely configurable, the wireless hops of the present invention may be dynamically reconfigurable. Thus, the wireless hops 150 may reconfigure themselves, as described above based on conditions of the network. For example, wireless hop 150c and 150b may reconfigure themselves so that PLCS subnet D communicates via wireless hop 150c instead of wireless hop 150b upon determination that such reconfiguration may result in improved system communications. Improved communications may include one or more of few errors, increased band rate, lower latency, or bypassing a failed component.

In some embodiments of the present invention, the wireless hops may be networked as a daisy chain network and in other embodiments the wireless hops may be networked as a mesh network that includes multiple data paths between various points on the network. In addition, one or more of the wireless hops of the mesh network or daisy chain embodiments may be reconfigured dynamically and/or remotely to be reconfigured to be a daisy chain or mesh network, respectively.

Figure 3:
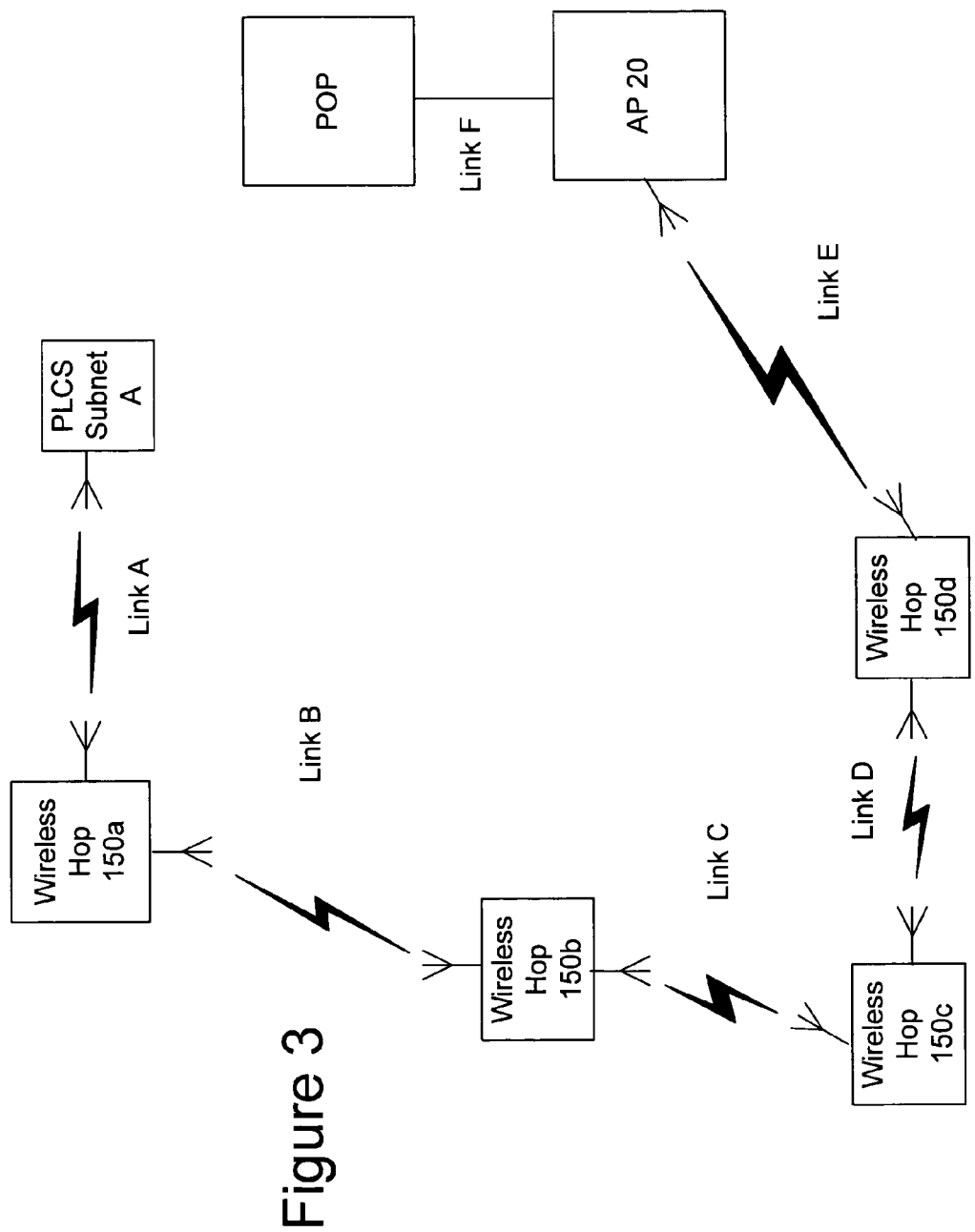
FIG. 3 is schematic diagram of another example embodiment of the present invention.

As shown in FIG. 3, each wireless hop 150 may be communicatively linked with only one upstream device (e.g., another wireless hop or other wireless device) and one downstream device (e.g., another wireless hop, or backhaul point). In this embodiment, it may be preferable to limit processing (such as error detection/correction) except at (1) the most upstream wireless hop 150d and the most downstream wireless hop 150a; (2) the downstream device with which the most downstream wireless hop 150a communicates (e.g., PSID of PLCS subnet A); and (3) the upstream device with which the most upstream hop 150d communicates (e.g., AP 20); or (4) some combination of (1), (2), and (3).

Figure 4:
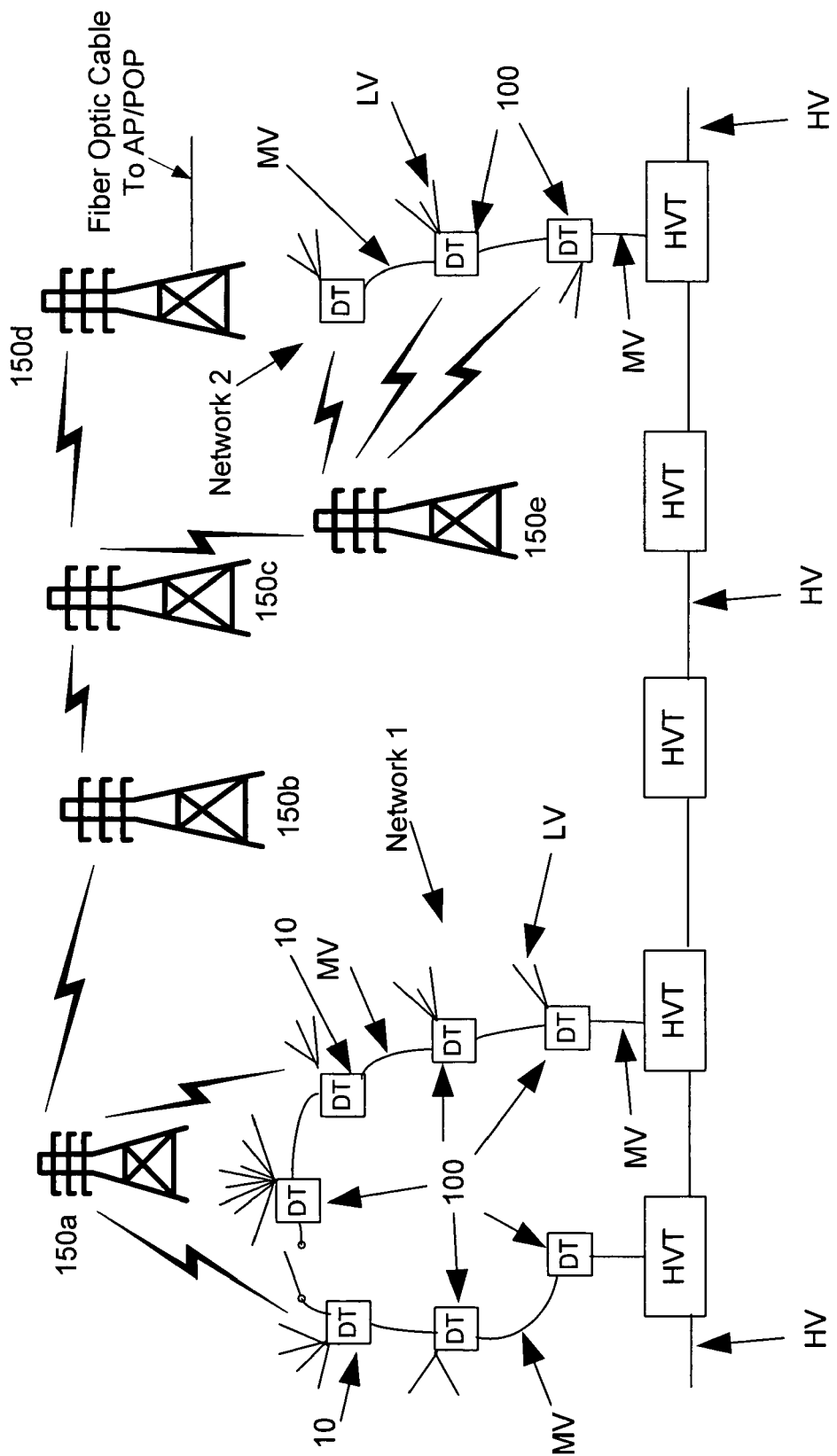
FIG. 4 is a block diagram of PLCS employing an example embodiment of the present invention.

FIG. 4 illustrates an example of a number of underground PLCS subnets that employ the present invention. Referring to network 1, a backhaul point 10 is installed at two distribution transformers (DTs) and a communications device 100 is installed at the remaining DTs. For ease of illustration, the communications devices in FIG. 4 are not shown separately from the DT. In network 1, each communications device 100 is in communication with a backhaul point 10 via the MV power line with which it is communicatively coupled and provides communications to the customer premises via the LV power lines. The communications devices 100 may communicate directly with the backhaul point 10, or the data may be repeated (demodulated, source decoded, channel decoded, error decoded, decrypted, and then encrypted, error encoded, channel encoded, source encoded and modulated) and/or amplified by one or more of the communications devices 100 between a communications device 100 and the backhaul point 10.

The backhaul points 10 are configured to provide an upstream wireless communications link for communicating via the multi-hop wireless link. Specifically, the backhaul points 10 of network 1 are in communication with wireless hop 150a, which is in wireless communication with wireless hop 150b, which is in wireless communication with wireless hop 150c, which is in wireless communication with wireless hop 150d, which is in communication with an AP or point of presence (or other upstream device) via a fiber optic cable. Wireless hops 150a, 150b, 150c, and 150d may be daisy chained together for bidirectional communications via time division multiplexing and/or frequency division multiplexing (e.g., a separate upstream and downstream frequency band) and may use any suitable license or unlicensed bands. For this and other embodiments herein, such frequencies may include the much used 900 MHz, 2.4 GHz, 5 GHz, 24 GHz, and/or 60 GHz wireless bands. Protocols (and therefore frequency bands) used may comprise those of IEEE 802.11a,b, org, 802.16, and/or 802.21. Wireless hops 150a, 150b, 150c, and 150d also may be comprised of two antennas (or alternately one multi-directional antenna) that may be attached to a tower, transformer enclosure, or other structure that facilitates wireless communications.

Network 2 comprises three DTs with a communications device 100 co-located therewith. Each of these communications devices 100 may be configured to wirelessly communicate with wireless hop 150e. Thus, network 2 in this example does not utilize the MV power lines to provide communications. Instead the devices 100 may communicate wirelessly to a wireless hop 150e that may include a router and perform the functions of the backhaul point of network 1 (e.g., gateway control, addressing, etc.). In networks 1 and 2, the communications devices 100 communicate with user devices in the customer premises via the low voltage power lines or, alternately, via another wireless link that may use the same or a different antenna, frequency, and/or protocol. In addition, the wireless communications between the wireless hops 150 may be wireless DOCSIS (Data Over Cable System Interface Specification) signals (e.g., DOCSIS 1.0, 1.1, or 2.0). Likewise, the signals communicated over the MV power line may be DOCSIS compliant signals (but perhaps in a different frequency than that of the wireless DOCSIS signals), Worldwide Interoperability for Microwave Access (WiMAX), or other OFDM signal set (e.g., a HomePlug).

Figure 5:
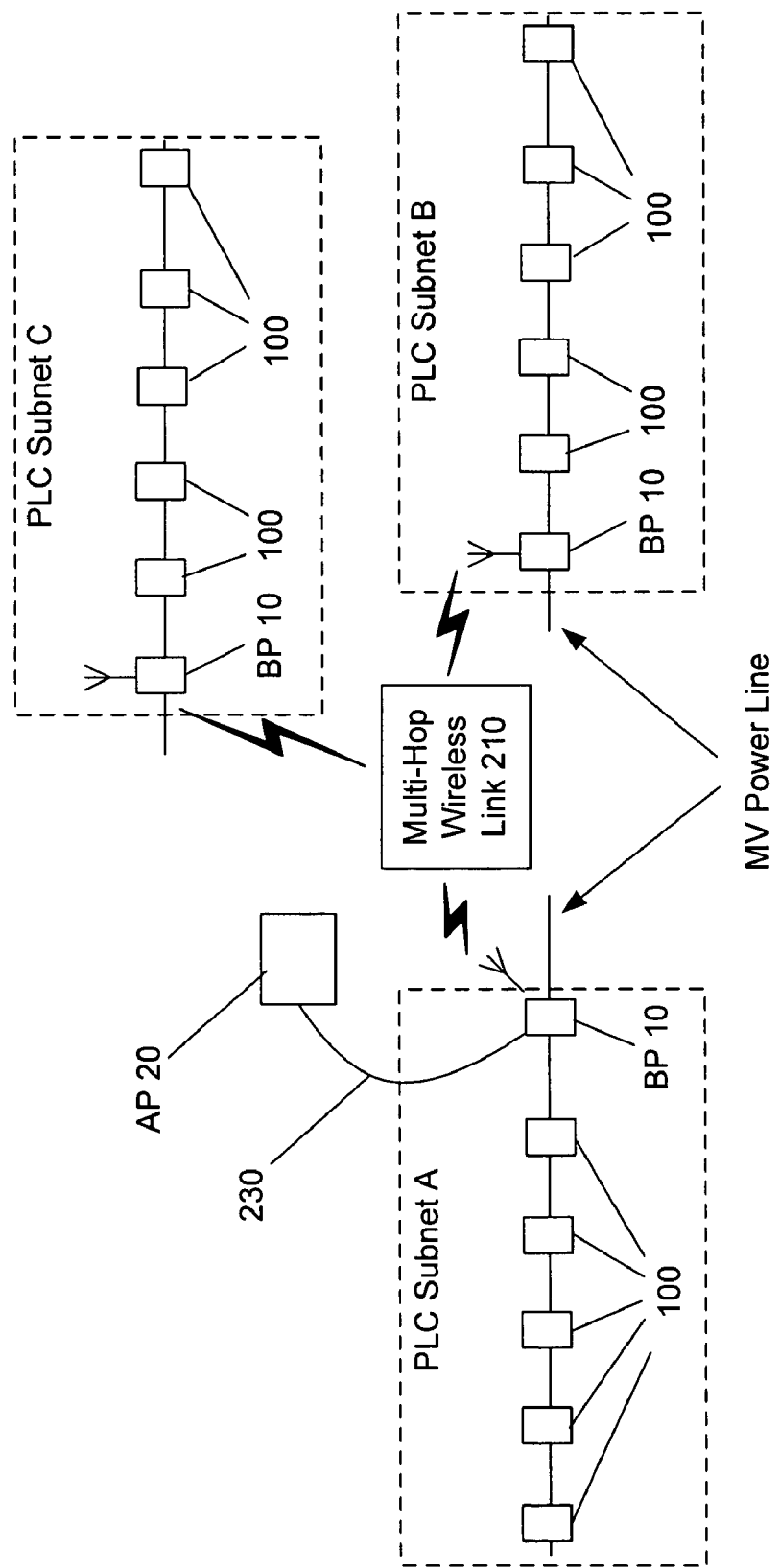
FIG. 5 is a block diagram of another PLCS employing another example embodiment of the present invention.

FIG. 5 illustrates an example embodiment of the present invention in which a backhaul point 10 (or device collocated therewith) of a first PLCS subnet A facilitates communications with other PLCS subnets (subnet B and C). The communication between PLCS subnets A and B and between PLCS subnets A and C are accomplished via a multi-hop wireless link 210 as described herein. Thus, data travels between PLCS subnet B or C and AP 20 via the multi-hop wireless link 210, the backhaul point 10*a* of PLCS subnet A and the backhaul link 230 of PLCS subnet A which may be a wired link (fiber optic, cable, DSL, T1) or wireless link (which may another multi-hop wireless link). Thus, the backhaul point 10*a* of PLCS subnet A may include a MV interface (e.g. including a power line modem), a fiber optic transceiver (or other wired transceiver), and a wireless transceiver.

PLCS subnet A, B, and/or C may be on the same or different power line conductor, set of multi-phase power lines, or power line cable (e.g., intrabundled cable). In this embodiment, the wireless-fiber interface is the backhaul point 10*a* of PLCS subnet A, but alternately could be a separate device collocated therewith and that routes data for all three PLCS subnets.

Another application of wireless links, including the multi-hop wireless link, may be to connect a wireless, Ethernet, and/or power line local area network (LAN), such as those used by businesses or multi-dwelling unit (MDU) (e.g., an apartment building, hospital, office building, etc.), to a PLCS (e.g., at the MV power line), a fiber optic, a coaxial cable, or other upstream link. Thus, a wireless link, including a multi-hop wireless link, may couple a backhaul point, bypass device, or power line repeater to a transceiver having an antenna on top of a building. The transceiver may be communicatively coupled to the structure's wireless, Ethernet, and/or power line LAN. A wireless link, which may or may not be a multi-hop wireless link, employing 60 Ghz frequency bands link may be very suitable for such a link. For example, the bypass device or other device may receive a MV power line signal in the 30-50 MHz band (e.g., a HomePlug 1.0 or AV signal) and demodulate, route, modulate, upband (e.g., to the 60 GHz band), amplify and transmit the signal to the transceiver in the building. In another example embodiment, the signal may be filtered, upbanded, and amplified without demodulation as discussed herein.

In addition, a wireless link, including a multi-hop wireless link, may be used to link a backhaul point, power line repeater, or bypass device to a micro-cell (or macro cell) site used for wireless communications (e.g., a wide area network or WAN). The power line communication system may be used to provide the backhaul link for the micro-cell or the wireless cell's communication link may be used as part of the backhaul link for the power line communications subnet. Alternately, the PLCS subnet may be coupled to the wireless WAN via a wired link (e.g., a fiber optic cable) to thereby provide a fiber/wireless backhaul link.

With respect to a URD PLCS subnet that employs a multi-hop wireless link, the URD PLCS subnet is often supplied electricity from an overhead tap in which a URD MV cable is electrically coupled to the overhead MV power line (e.g., a pole riser) and may traverse down a utility pole into the ground. Thus, the backhaul point for the URD PLCS subnet may be on or near the utility pole and be communicatively coupled to the URD MV power cable to which one or more power line devices are coupled (and installed at underground or pad mount transformers). Thus, a wireless link, including a multi-hop wireless link, may be used as the backhaul link from backhaul point at the pole riser to the upstream device (e.g., an aggregation point).

Another application of the multi-hop wireless link is to bridge around or through power line communication obstacles or fiber obstacles. For example, intersections, such as those having street lights, may provide an obstacle to installing fiber and communicating over the power lines. Consequently, the multi-hop wireless link may be used to bridge around or through the intersection (e.g., by connecting each end of the multi-hop wireless link to fiber or simply using the multi-hop wireless link instead of fiber as the backhaul link for the PLCS). Because the distance around or through the obstacle may be short, there may not be a need to use a hop system as described herein. Instead, the link may be a conventional wireless link (e.g., an IEEE 802.11a,b, or g link, a 60 GHz link, or a wireless GigE link (such as available, for example, via Bridgewave referenced above). In addition, the devices that convert from the power line signal (or fiber) to the wireless signal may demodulate, route, modulate, and transmit the signal or may simply filter, amplify, frequency shift, and amplify the signal (i.e., without demodulation/modulation) thereby reducing latency. In addition, the wireless link may bridge between two fiber optic links that form part of a power line backhaul link. This implementation, and others described herein, may use a street light because the street light can supply electric power, is often suitably located, and may provide sufficient height and/or line of sight.

Another application of the present invention is to link one or more power line communications devices (e.g., bypass devices) to a backhaul point. For example, a wireless link such as 60 Ghz wireless link, which may be a multi-hop wireless link or a wireless link without intermediate hops, may link a backhaul point connected to a first MV power line (e.g., on one side of the street) to a bypass device or MV repeater on the other side of the street that is coupled to second MV power line. In addition, their wireless communications be accomplished via frequency shifting the OFDM signal (e.g., a HomePlug signal) to the wireless band. Thus, the signal received by the MV repeater or bypass device may be filtered, downbanded, and amplified for transmission onto the MV power line for reception by one or more power line devices (i.e., without demodulation). In addition, in any of the embodiments herein any of the power line signals, such as an IEEE 802.11, a WiMAX, Homeplug, or DS2 modem signal or other suitable OFDM signal may be frequency shifted between the frequency band suitable for conductor (e.g., power line) communications and wireless communications with or without demodulation/modulation.

As will be evident to those skilled in the art, there are various methods of integrating or interfacing the multi-hop wireless link with the PLC subnet(s). For example, the PLC subnet may employ a first frequency band to communicate over the MV power line, such as 30-50 MHz (with 30-40 MHz for downstream communications and 40-50 MHz for upstream communications). The upstream communications received by the backhaul point 10 may be frequency translated to a frequency band used by the multi-hop wireless link (e.g., 2.4 GHz, 5 GHz, 60 GHz or other band described herein) without additional significant processing (e.g., perhaps only filtering and amplifying and without demodulating and modulating). Downstream communications received by the backhaul point 10 from the multi-hop wireless link may similarly be frequency translated by the backhaul point 10 from the wireless frequency band to the band used for downstream communications over the MV power line without additional significant processing. In an alternate embodiment, the PLC subnet may employ surface waves (otherwise known as Gaubau waves) to communicate over the power lines.

In some embodiments, it may be desirable to use the same signal set for communications through the multi-hop wireless link as that which is used one the power lines in the PLCS. For example, in the URD system that uses a DOCSIS signal set, whose description is incorporated herein, it may be desirable to use a DOCSIS signal set over the multi-hop wireless link translated to a different band. Similarly, and for example purposes only, other multi-hop wireless links may be employ the HomePlug, WiMAX, or other OFDM signal set used by the PLCS albeit at different frequency bands.

In some embodiments, it may be desirable to provide the backhaul link from the PLCS subnet via a first fiber optic cable, via a first multi-hop wireless link, via a second fiber optic cable or coaxial cable, and via a second multi-hop wireless link. Consequently, the multi-hop wireless link may be combined with other mediums to provide the PLC backhaul link.

In addition, the wireless hop system may be used to provide communications for a micro cell or hotspot for licensed or unlicensed bands to provide communications for businesses and/or residences.

In summary, in some embodiments, the PLC device (e.g., bypass device or backhaul point) may include a power line modem configured to communicate via a power line, a wireless transceiver communicatively coupled to the modem and configured to communicate via a wireless link, and wherein the wireless link includes at least one frequency band having a carrier greater than two megahertz. In other embodiments, the device may comprise a filter configured to filter incoming signals to provide the power line signals, a first amplifier communicatively coupled to said filter and configured to amplify the power line signals, a frequency converter communicatively coupled to said first amplifier and configured to frequency shift amplified the power line signals from a first frequency band to a second frequency band, an antenna communicatively coupled to said frequency converter and configured to wirelessly transmit (radiate) the frequency shifted signals, and wherein the power line signals are received from the power line and wirelessly radiated without demodulation of the power line signals. In addition, the antenna may be communicatively coupled to the frequency converter via a second amplifier. In addition, the second frequency band may comprise an IEEE 802.11 frequency band, at least one frequency band having a carrier greater than two megahertz, at least one frequency band having a carrier greater than five megahertz, or at least one frequency band having a carrier greater than fifty seven megahertz.

Miscellaneous

Finally, the type of data signal coupled onto the power lines of the PLCS may be any suitable type of data signal. The type of signal modulation used can be any suitable signal modulation used in communications (Code Division Multiple Access (CDMA), Time Division Multiple Access (TDMA), Frequency Division Multiplex (FDM), Orthogonal Frequency Division Multiplex (OFDM), and the like). OFDM may be used on one or both of the LV and MV power lines. A modulation scheme producing a wideband signal such as CDMA that is relatively flat in the spectral domain may be used to reduce radiated interference to other systems while still delivering high data communication rates.

In the above embodiment, the backhaul point may include a coupler, coupled to a modem, coupled to a wireless transceiver, both of which may be coupled to a processor. In another embodiment, for upstream communications the backhaul point may include a coupler, connected to a filter, amplifier, frequency converter, amplifier, and filter—thereby providing an amplifying backhaul point that does not modulate or demodulate data. Similarly, for downstream communications, the backhaul point may include another set of these amplifying components. Thus, in this embodiment the backhaul point simply frequency converts the data signals between the two frequency bands used by the wireless link and the MV power line and need not demodulate, modulate and perform other processing.

Similarly, in some embodiments a backhaul point may be co-located with any or all of the wireless hops described herein. For example, referring to FIG. 3, a backhaul point may be located at wireless hop 150*b* and connected to the radio(s) via a fiber optic cable or via an Ethernet link. Thus, the wireless hop 150*b* may include three ports (one for each wireless direction and one for the backhaul point data port). Similarly, the backhaul points described herein that communicate via a wireless link may include a MV interface, router, and fiber optic (or Ethernet) interface that is communicatively coupled to a wireless transceiver as described herein. The wireless transceiver may be co-located on the same utility pole or co-located on a nearby structure.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended Those skilled in the art, having the benefit of the teachings of this specification, may affect numerous modifications thereto and changes may be made without departing from the scope and spirit of the invention.

What is claimed is:

1. A communications system, comprising:
a first power line communications system (PLCS) subnet;
an upstream communications device in communication with a point-of-presence;
a multi-hop wireless link providing a communications path between said PLCS subnet and said upstream communication device;
wherein said multi-hop wireless link comprises a first and second wireless hop communicatively coupled to each other via a first wireless link;
wherein said first wireless link includes a wireless downstream link in which data travels from said first wireless hop toward said second wireless hop;

wherein said first wireless link includes a wireless upstream link in which data travels from said second wireless hop toward said first wireless hop;

wherein said wireless upstream link and said wireless downstream link are orthogonal to each other; and wherein said first wireless link comprises a full duplex wireless link.

2. The system of claim 1, wherein said first wireless hop is communicatively coupled to said PLCS subnet via a second wireless link.

3. The system of claim 2, wherein said second wireless hop is communicatively coupled to said upstream communications device via a third wireless link.

4. The system of claim 1, wherein said second wireless hop is communicatively coupled to said upstream communications device via a second wireless link.

5. The system of claim 2, wherein said first wireless hop is configured to not demodulate data signals communicated via said first wireless link.

6. The system of claim 2, wherein said first wireless hop is configured to not perform error detection on data communicated via said first wireless link.

7. The system of claim 3, wherein said first and second wireless hops are configured to not perform error detection on data communicated via said first wireless link.

8. The system of claim 1, wherein said first and second wireless hops are configured to communicate with each other via an IEEE 802.11 protocol.

9. The system of claim 2, wherein said first wireless link and said second wireless link are orthogonal to each other.

10. The system of claim 1, wherein said first wireless hop is coupled to said PLCS subnet via a wired connection and said second wireless hop is communicatively coupled to said upstream communications device via a second wireless link.

11. The system of claim 1, wherein said first wireless link includes a third wireless hop communicatively coupled to said first wireless hop and said second wireless hop.

12. The system of claim 1, wherein said first and second wireless hops are configured to communicate with each other via a Data Over Cable System Interface Specification (DOCSIS) protocol.

13. The system of claim 1, wherein said first wireless link includes a frequency band at about sixty gigahertz.

14. The system of claim 1, further comprising:
a third wireless hop communicatively coupled to said second wireless hop via a second wireless link; and
wherein said third wireless hop is communicatively coupled to a second PLCS subnet.

15. The system of claim 1, wherein the distance between said first wireless hop and said second wireless hop is less than one thousand feet.

16. The system of claim 1, wherein said first wireless hop is communicatively coupled to a second PLOS subnet and said first wireless hop includes a router.

17. The system of claim 2, wherein the first and second wireless links comprise licensed frequency bands.

18. A system for providing communications over a portion of an electrical distribution network comprising a power line carrying power, comprising:
a first medium voltage interface device (MVID) comprising a backhaul wireless transceiver and a first power line port in communication with said backhaul wireless transceiver and configured to communicate via the power line;
a first wireless communications device in wireless communication with said first MVID via a first wireless link;
a second wireless communications device in wireless communication with said first wireless communications device via a second wireless link;
wherein said second wireless link includes a wireless downstream link in which data travels from said second wireless communications device toward said first wireless communications device;
wherein said second wireless link includes a wireless upstream link in which data travels from said first wireless communications device toward said second wireless communications device;
wherein said wireless upstream link and said wireless downstream link are orthogonal to each other; and
wherein said second wireless link comprises a full duplex wireless link.

19. The system of claim 18, further comprising a third wireless communications device in wireless communication with said first wireless communications device via a third wireless link.

20. The system of claim 18, wherein said second wireless communications device includes a wired port for communications with a second MVID.

21. The system of claim 20, wherein said second wireless communications device further comprises a router in communications with said wired port.

22. The system of claim 18, wherein said first MVID further comprises a router in communication with said backhaul wireless transceiver.

23. The system of claim 18, wherein the first and second wireless links comprise unlicensed orthogonal frequency bands.

24. The system of claim 18, wherein the first and second wireless links comprise licensed frequency bands.

25. The system of claim 18, wherein said first wireless communications device is configured to not demodulate data signals.

26. The system of claim 18, further comprising:
a third wireless communications device in wireless communication with said second wireless communications device via a third wireless link; and
wherein said second wireless communications device comprises a router.

27. The system of claim 18, wherein said first wireless communications device includes a first radio configured to communicate via said first wireless link, a second radio configured to communicate via said second wireless link; and a router in communication with said first radio and said second radio.

28. A method of providing communications over an electrical distribution network comprising at least one medium voltage (MV) power line and at least one low voltage power line, the method comprising:
receiving first data from the MV power line at a first device;
wirelessly transmitting the first data from the first device via a first wireless link;
wirelessly receiving the first data transmitted from the first device at a second device;
wirelessly transmitting the first data from the second device via a second wireless link; and
wirelessly receiving the first data transmitted from the second device at a third device;
wherein said second wireless link includes a wireless downstream link in which data travels from said second device toward said first device;
wherein said second wireless link includes a wireless upstream link in which data travels from said first device toward said second device;

wherein said wireless upstream link and said wireless downstream link are orthogonal to each other; and wherein said second wireless link comprises a full duplex wireless link.

29. The method of claim 28, further comprising:

wirelessly transmitting the first data from the third device via a third wireless link; and wirelessly receiving the first data transmitted from the third device at a fourth device.

30. The method of claim 28, wherein said first and second wireless links are orthogonal to each other.

31. The method of claim 28, wherein the second device is configured to not perform error detection of one or more data packets carrying the first data.

32. The method of claim 31, wherein the third device is configured to not perform error detection of one or more data packets carrying the first data.

33. The method of claim 29, wherein the fourth device is configured to not perform error detection of one or more data packets carrying the first data.

34. The method of claim 28, further comprising routing the first data at the first device.

35. The method of claim 28, further comprising routing the first data at the second device.

36. The method of claim 29, wherein the time for data to be communicated from said second device to said fourth device is less than six milliseconds for ninety-nine percent of the data.

37. The system of claim 28, wherein said second communications device is configured to not demodulate received data signals carrying the first data.

38. The system of claim 28, wherein the first and second wireless links comprise licensed frequency bands.

39. The method of claim 28, further comprising:

wirelessly receiving second data wirelessly transmitted from a fourth device at the second device;

wirelessly transmitting the second data from the second device via the second wireless link; and wirelessly receiving the second data transmitted from the second device at the third device.

40. The method of claim 39, further comprising routing the first data and the second data at the second device.

* * * * *

UNITED STATES PATENT AND TRADEMARK OFFICE
CERTIFICATE OF CORRECTION

| | |
|---|---|
| PATENT NO. | : 7,508,834 B2 |
| APPLICATION NO. | : 11/156614 |
| DATED | : March 24, 2009 |
| INVENTOR(S) | : Berkman et al. |

Page 1 of 1

It is certified that error appears in the above-identified patent and that said Letters Patent is hereby corrected as shown below:

In column 1, line 22, after "data." delete "I".

In column 12, line 46, delete "bidirectional" and insert -- bi-directional --, therefor.

In column 12, line 53, delete "org," and insert -- or g, --, therefor.

In column 16, line 47, after "appended" insert -- . --.

In column 17, line 54, in Claim 16, delete "PLOS" and insert -- PLCS --, therefor.

Signed and Sealed this

Twenty-sixth Day of May, 2009

JOHN DOLL
*Acting Director of the United States Patent and Trademark Office*